US010056802B2

(12) United States Patent
 Kubota (10) Patent No.: US 10,056,802 B2
(45) Date of Patent: Aug. 21, 2018

(54) VEHICLE DRIVING DEVICE

(71) Applicant: SUZUKI MOTOR CORPORATION, Hamamatsu-shi, Shizuoka (JP)

(72) Inventor: Yoshihisa Kubota, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 415 days.

(21) Appl. No.: 14/849,520

(22) Filed: Sep. 9, 2015

(65) Prior Publication Data
 US 2016/0079823 A1    Mar. 17, 2016

(30) Foreign Application Priority Data

Sep. 12, 2014 (JP) .................................. 2014-185893

(51) Int. Cl.
 *B60K 6/405* (2007.10)
 *B60W 10/30* (2006.01)
 (Continued)

(52) U.S. Cl.
 CPC ............. *H02K 7/006* (2013.01); *H02K 5/10* (2013.01); *H02K 11/001* (2013.01)

(58) Field of Classification Search
 CPC .......... B60K 6/40; B60K 6/405; B60K 6/445; B60K 6/48; B60K 6/26; B60K 17/02;
 (Continued)

(56) References Cited

U.S. PATENT DOCUMENTS 8,555,748 B2 * 10/2013 Maekawa ............... H02K 3/522
 310/68 C
8,652,001 B2 * 2/2014 Iwase ..................... B60K 6/40
 477/8
(Continued)

FOREIGN PATENT DOCUMENTS

CN 101885333 A 11/2010
CN 102574453 A 7/2012
(Continued)

OTHER PUBLICATIONS

Chinese Office Action dated Jun. 26, 2017, issued by the State Intellectual Property Office of the People's Republic of china in corresponding application CN 201510575555.3.
(Continued)

*Primary Examiner* — Edgardo San Martin
(74) *Attorney, Agent, or Firm* — Stein IP, LLC (57) ABSTRACT

A vehicle driving device includes a rotation shaft, a motor, a drive case having an end wall, a rotation detecting sensor, and an oil pump. The rotation detecting sensor has a sensor rotor and a sensor stator which is fixed to an inner surface of the end wall by a stator fastener. The oil pump includes a pump rotor, an oil pump cover and a seal member. The oil pump cover is joined to a joining surface formed on the outer surface of the end wall by fastening a cover fastener to a cover screw hole. The cover screw hole is formed into a shape opened only to the outside of the drive case and disposed outside of the seal member and a through hole through which the stator fastener is inserted is disposed on the joining surface inside of the seal member.

4 Claims, 7 Drawing Sheets

(51) Int. Cl.
*H02K 9/19* (2006.01)
*H02K 7/00* (2006.01)
*H02K 11/00* (2016.01)
*H02K 5/10* (2006.01)
*B60K 6/40* (2007.10)

(58) Field of Classification Search
CPC ......... B60W 10/08; B60W 10/30; F16H 3/66; F16H 3/72; F16H 57/04; F16H 1/28; B60L 11/14; H02K 7/18; H02K 9/19; H02K 9/193; F04C 15/00; F04C 2/10
See application file for complete search history.

(56) References Cited

U.S. PATENT DOCUMENTS

| 8,678,784 | B2* | 3/2014 | Atarashi | B60K 6/26 417/372 |
| 9,136,745 | B2* | 9/2015 | Nagahama | H02K 9/19 |
| 2010/0288597 | A1 | 11/2010 | Kuwahara et al. | 192/85.61 |
| 2011/0076165 | A1 | 3/2011 | Atarashi et al. | 417/321 |
| 2012/0080248 | A1 | 4/2012 | Kasuya et al. | 180/65.21 |
| 2012/0080286 | A1 | 4/2012 | Kasuya et al. | 192/113.3 |
| 2012/0217830 | A1 | 8/2012 | Iwase et al. | 310/78 |
| 2012/0319514 | A1* | 12/2012 | Iwase | B60K 6/40 310/78 |
| 2013/0283972 | A1 | 10/2013 | Yamamoto et al. | 74/665 |

FOREIGN PATENT DOCUMENTS

| CN | 103081311 A | 5/2013 |
| CN | 103328244 A | 9/2013 |
| CN | 103925209 A | 7/2014 |
| JP | 2007-153114 A | 6/2007 |
| JP | 2008-145153 A | 6/2008 |
| JP | 2011-89636 A | 5/2011 |
| JP | 2012-86826 A | 5/2012 |
| JP | 2013-18373 A | 1/2013 |
| JP | 2013-177030 A | 9/2013 |

OTHER PUBLICATIONS

Japanese Office Action dated Jan. 22, 2018, issued to Japanese Application No. 2014-185893.

* cited by examiner

FIG. 6

VEHICLE DRIVING DEVICE

CROSS-REFERENCE TO RELATED APPLICATIONS

The disclosure of Japanese Patent Application No. 2014-185893 filed on Sep. 12, 2014, including specification, drawings and claims is incorporated herein by reference in its entirety.

TECHNICAL FIELD

The present invention relates to a vehicle driving device and, more particularly, to a vehicle driving device where the arrangement of built-in mechanisms is optimized and the improvement in the assembling workability and the reduction in size of the device are achieved.

BACKGROUND

A hybrid vehicle is equipped with a vehicle driving device which includes an engine and a motor serving as an electric motor and a generator. In the vehicle driving device, a motor of a driving force transmitting mechanism having a motor rotor and a motor stator is accommodated in a drive case. The vehicle driving device includes a rotation detecting sensor for detecting the rotation of the motor rotor and an oil pump for supplying oil to each part of the device.

As a conventional vehicle driving device, Patent Document 1 discloses a structure that a rotation detecting sensor is disposed between an oil pump and a motor rotor of a motor generator, a boss is provided at a position different from a housing of the oil pump in order to fix a sensor stator of the rotation detecting sensor to a case, and the sensor stator is mounted to the boss via a fastener such as a bolt.

Further, as a conventional vehicle driving device, Patent Document 2 discloses a structure that a rotation detecting sensor is disposed on the outside of an oil pump, a sensor stator of the rotation detecting sensor is mounted to a cover member via a fastener such as a bolt and placed on the side of a motor generator, and thus, the compactness of the entire driving device is achieved.

Patent Document 1: Japanese Patent Application Publication No. 2013-018373A

Patent Document 2: Japanese Patent Application Publication No. 2007-153114A

However, in the structure of Patent Document 1, the sensor stator of the rotation detecting sensor is extended to a position of overlapping with the motor rotor and the motor stator in an axial direction of the rotation shaft. Therefore, magnetism occurring between the motor rotor and the motor stator or magnetism flying into a space within the drive case from the motor stator is liable to be transmitted to the rotation detecting sensor, and thus, the rotation position detecting precision of the rotation detecting sensor is lowered. As a result, there is a possibility that the reduction in the reliability of the rotation detecting sensor is caused.

Further, in the structure of Patent Document 1, the rotation detecting sensor is mounted to the rotation shaft, and thus, there is a need to provide a space occupied by the rotation detecting sensor. As a result, there is a problem that the size of the driving device in the axial direction of the rotation shaft is increased.

Further, in the structure of Patent Document 2, the rotation detecting sensor is extended to a position of overlapping with the motor rotor and the motor stator in an axial direction of the rotation shaft. Therefore, in the structure of Patent Document 2, magnetism occurring between the motor rotor and the motor stator or magnetism flying into a space within a case from the motor stator is liable to be transmitted to the rotation detecting sensor, and thus, the rotation position detecting precision of the rotation detecting sensor is lowered. As a result, there is a possibility that the reduction in the reliability of the rotation detecting sensor is caused.

Further, in the structure of Patent Document 2, there is a problem that the size of the rotation detecting sensor is increased. Further, in the structure of Patent Document 2, in order to adjust the rotation position of the rotation detecting sensor, there is a need to provide a dedicated position adjusting hole in the drive case and to provide a dedicated plug for plugging the position adjusting hole. As a result, there is a possibility of lowering a worker's workability.

Furthermore, in the structures of Patent Documents 1 and 2, the rotation detecting sensor is fixed in the drive case by a fastener. However, in the case of a structure where the rotation detecting sensor is fixed by a fastener from the outside of the drive case, there is a need to mount a seal for preventing the oil leakage from a through hole, through which the fastener is inserted. As a result, there is a problem of causing an increase in an assembling work.

SUMMARY

It is an object of the present invention to provide a vehicle driving device having a drive case for accommodating a driving force transmitting mechanism, capable of preventing the oil leakage while achieving the improvement in the assembling workability and the reduction in size of the driving device.

According to an aspect of the embodiments of the present invention, there is provided a vehicle driving device comprising: a rotation shaft disposed on an outer periphery of a pump connecting shaft member configured to be driven by an engine; a motor disposed on an outer periphery of the rotation shaft; a drive case having an end wall extending along an end surface of the motor, a central portion of the end wall through which the pump connecting shaft member penetrates; a rotation detecting sensor having a sensor rotor configured to rotate integrally with a motor rotor of the motor and a sensor stator which is fixed to an inner surface of the end wall by a stator fastener penetrating through the end wall in order to detect a rotation of the sensor rotor; and an oil pump comprising: a pump rotor disposed within a pump chamber formed on an outer surface of the end wall and configured to be driven by the pump connecting shaft member; an oil pump cover joined to a joining surface formed on the outer surface of the end wall by fastening a cover fastener to a cover screw hole arranged in the joining surface, in order to make the pump chamber into a closed space; and a seal member formed in an annular shape to surround an outer periphery of the pump chamber and disposed between the joining surface and the oil pump cover, wherein the cover screw hole is formed into a shape opened only to the outside of the drive case and disposed on the joining surface outside of the seal member, and a through hole through which the stator fastener is inserted, is disposed on the joining surface inside of the seal member.

With this configuration, the through hole, through which the stator fastener for fixing the sensor stator to the end wall is inserted, is disposed on the joining surface inside of the seal member. Therefore, the seal between the stator fastener and the through hole and the seal for the oil pump can be achieved by one seal member, without providing a plurality of seal members in the oil pump as in a conventional structure. As a result, one seal member can prevent the leakage of the oil from the oil pump and the portion between the stator fastener and the through hole.

In this way, a worker can reduce a work of mounting the oil pump, thereby improving the workability.

Furthermore, according to the above configuration, the through hole, through which the stator fastener is inserted, is disposed on the joining surface inside of the seal member of the oil pump. Therefore, there is no need to excessively increase a diameter dimension of the rotation detecting sensor. As a result, it is possible to reduce the dimension in the radial direction of the rotation detecting sensor.

In this way, the rotation detecting sensor can be easily accommodated in the space surrounded by the rotation shaft and the motor disposed on an outer periphery of the rotation shaft, and the rotation detecting sensor and the motor can be arranged in an overlapped manner in an axial direction of the rotation shaft. As a result, it is possible to reduce the size of the device.

DETAILED DESCRIPTION OF THE EMBODIMENTS

Hereinafter, an illustrative embodiment of the present invention will be described with reference to the drawings.

Figure 1:
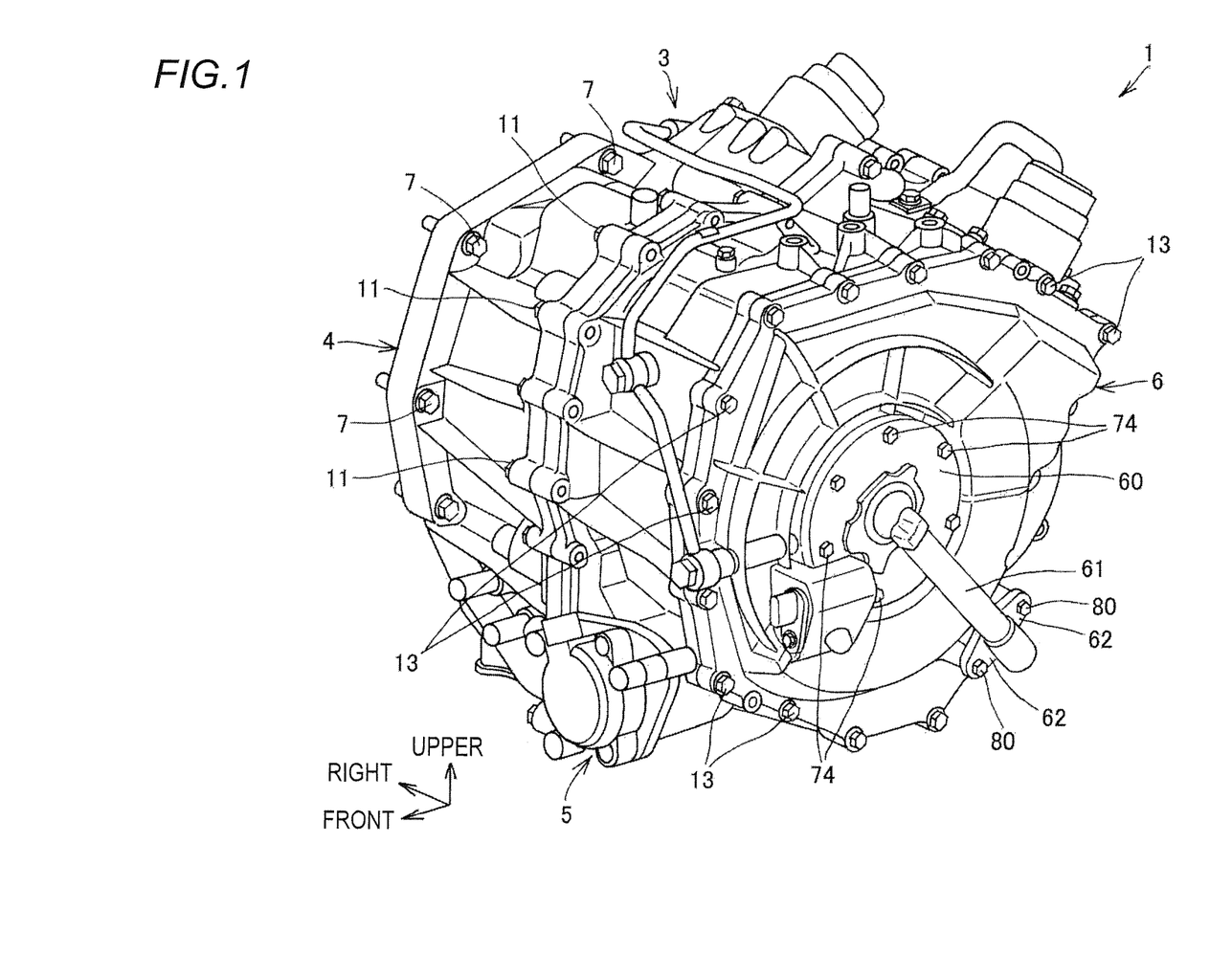
FIG. 1 is a perspective view of a vehicle driving device according to an embodiment of the present invention.
Figure 2:
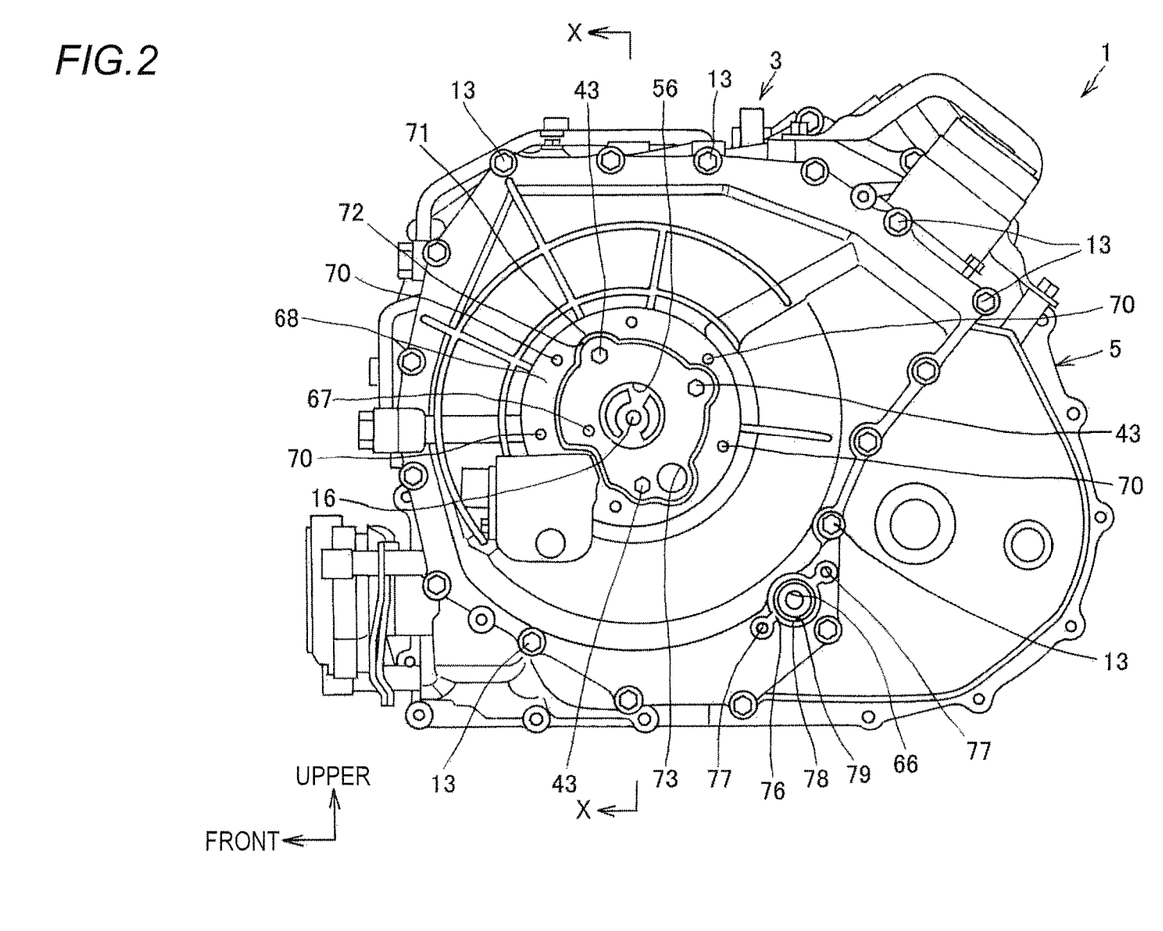
FIG. 2 is a side view of the vehicle driving device from which an oil pump cover is removed according to an embodiment of the present invention.
Figure 3:
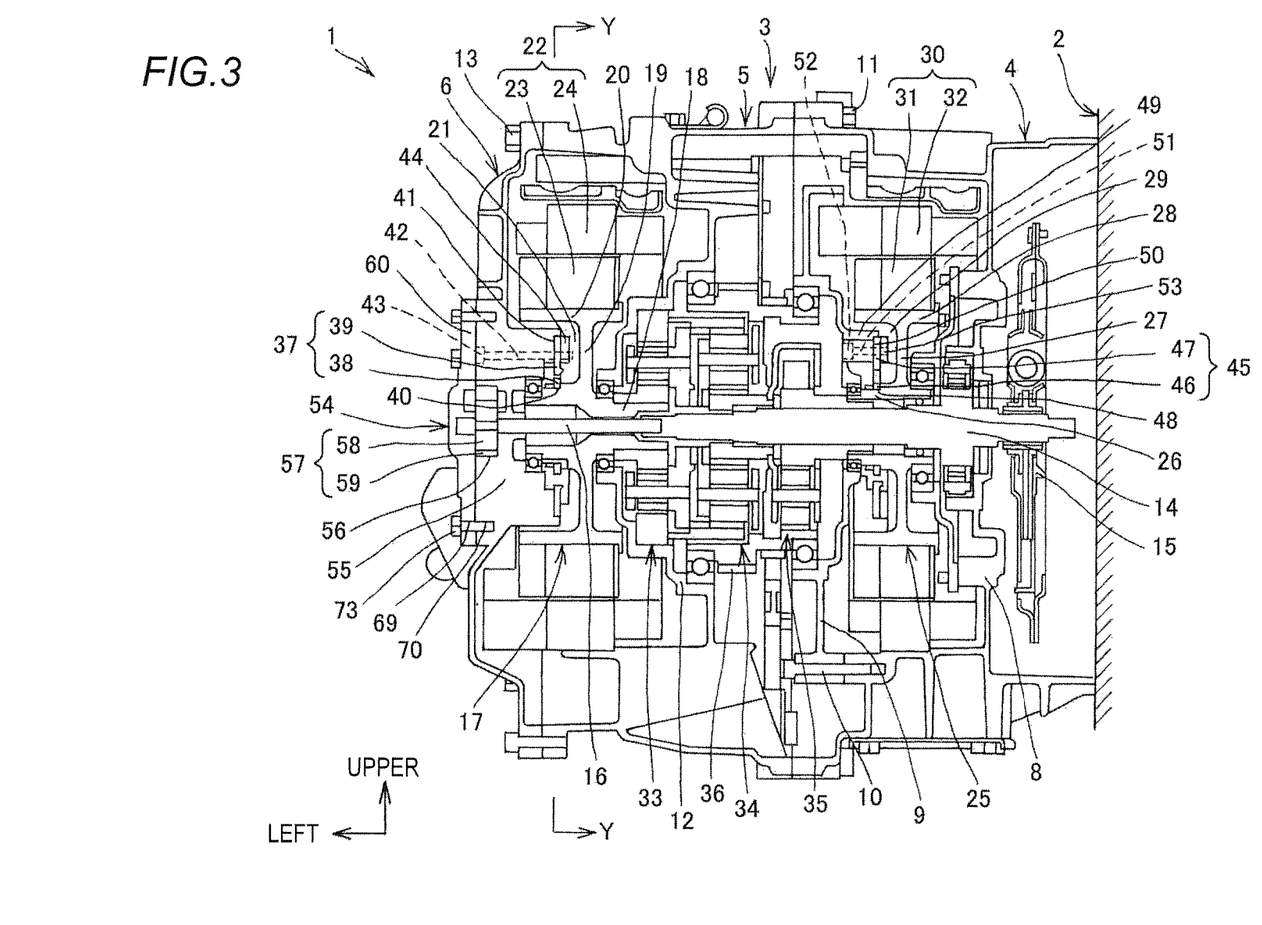
FIG. 3 is a sectional view of the vehicle driving device, taken along a line X-X in FIG. 2 according to an embodiment of the present invention.

FIGS. 1 to 7 show an illustrative embodiment of the present invention. As shown in FIGS. 1 to 3, a vehicle driving device 1 includes a drive case 3 which is connected to a driving engine 2. The drive case 3 is composed of a first case part 4 and a second case part 5 and has an end wall 6.

The first case part 4 is formed in a substantially cylindrical shape and one side in an axial direction thereof is fastened to the engine 2 by a mounting bolt 7 that is a fastener. The first case part 4 has a first case wall portion 8 and an auxiliary wall portion 9 therein. The auxiliary wall portion 9 is mounted to the other side of the first case part 4 by a mounting bolt 10 that is a fastener. The second case part 5 is formed in a substantially cylindrical shape and one side in an axial direction thereof is fastened to the other side in the axial direction of the first case part 4 by a mounting bolt 11 that is a fastener. The second case part 5 has a second case wall portion 12 in the interior of one side in the axial direction thereof. The end wall 6 is formed in a substantially disc shape extending along an end surface of a first motor generator 22 (to be described later). The end wall 6 is fastened to the other side in the axial direction of the second case part 5 by a mounting bolt 13 that is a fastener.

The vehicle driving device 1 includes an engine connecting shaft member 14 which is driven by the engine 2. The engine connecting shaft member 14 is pivotally supported on the first case wall portion 8 and the auxiliary wall portion 9 of the first case part 4 via a bearing. One side in the axial direction of the engine connecting shaft member 14 is connected to a crankshaft of the engine 2 via a clutch 15. One side in the axial direction of a pump connecting shaft member 16 is connected to the other side of the engine connecting shaft member 14. The pump connecting shaft member 16 is disposed in such a way that the other side in the axial direction thereof penetrates a central portion of the end wall 6. The pump connecting shaft member 16 is driven by the engine 2 via the engine connecting shaft member 14.

The vehicle driving device 1 includes a first rotation shaft 17 disposed on an outer periphery of the pump connecting shaft member 16. The first rotation shaft 17 has a first cylindrical body portion 18, a first disc-shaped connecting portion 19, and a first cylindrical rotor support portion 20. An inner periphery of the first body portion 18 is pivotally supported on the pump connecting shaft member 16 via a bearing and an outer periphery thereof is pivotally supported on the second case wall portion 12 of the second case part 5 and the end wall 6 via a bearing. The first connecting portion 19 extends outward in a radial direction from an outer peripheral surface of the first body portion 18. The first rotor support portion 20 extends in an axial direction of the first body portion 18 from an outer peripheral edge of the first connecting portion 19. The first body portion 18, the first connecting portion 19 and the first rotor support portion 20 are formed in an H-shaped cross section. A first space 21, which is surrounded by the first body portion 18, the first connecting portion 19 and the first rotor support portion 20, is provided on the end wall 5 side.

The vehicle driving device 1 includes a first motor generator 22 which is disposed on an outer periphery of the first rotation shaft 17 and serves as an electric motor and a generator. The first motor generator 22 includes a first motor rotor 23 and a first motor stator 24. An inner peripheral surface of the first motor rotor 23 is supported on an outer peripheral surface of the first rotor support portion 20. An inner peripheral surface of the first motor stator 24 is disposed adjacent to the outer peripheral surface of the first motor rotor 23 and an outer peripheral surface thereof is supported on an inner peripheral surface of the second case part 5. The end wall 6 of the drive case 3 extends outward in a radial direction along an end surface of the first motor generator 22 opposite to the engine 2.

Further, the vehicle driving device 1 includes a second rotation shaft 25 disposed on an outer periphery of the engine connecting shaft member 14. The second rotation shaft 25 has a second cylindrical body portion 26, a second disc-shaped connecting portion 27, and a second cylindrical rotor support portion 28. An inner periphery of the second body portion 26 is pivotally supported on the engine connecting shaft member 14 via a bearing and an outer periphery thereof is pivotally supported on the first case wall portion 8 of the first case part 4 and the auxiliary wall portion 9 via a bearing. The second connecting portion 27 extends outward in a radial direction from an outer peripheral surface of the second body portion 26. The second rotor support portion 28 extends in an axial direction of the engine connecting shaft member 14 from an outer peripheral edge of the second connecting portion 27. The second body portion 26, the second connecting portion 27 and the second rotor support portion 28 are formed in an H-shaped cross section. A second space 29, which is surrounded by the first body portion 26, the second connecting portion 27 and the second rotor support portion 28, is provided on the auxiliary wall portion 9 side.

The vehicle driving device 1 includes a second motor generator 30 which is disposed on an outer periphery of the second rotation shaft 25 and serves as an electric motor and a generator. The second motor generator 30 includes a second motor rotor 31 and a second motor stator 32. An inner peripheral surface of the second motor rotor 31 is supported on an outer peripheral surface of the second rotor support portion 28. An inner peripheral surface of the second motor stator 32 is disposed adjacent to the outer peripheral surface of the second motor rotor 31 and an outer peripheral surface thereof is supported on an inner peripheral surface of the first case part 4.

In the vehicle driving device 1, first to third planetary gear mechanisms 33 to 35 are arranged between the auxiliary wall portion 9 of the first case part 4 and the second case wall portion 12 of the second case part 5 and on an outer periphery of the engine connecting shaft member 14.

A driving force of the first motor generator 22 is transmitted in order of the first planetary gear mechanism 33, the second planetary gear mechanism 34, the engine connecting shaft member 14 and the third planetary gear mechanism 35, and then, transmitted to an output gear 36. A driving force of the second motor generator 30 is transmitted in order of the third planetary gear mechanism 35 and the engine connecting shaft member 14, and then, transmitted to the output gear 36. A driving force of the engine 2 is transmitted in order of the engine connecting shaft member 14 and the third planetary gear mechanism 35, and then, transmitted to the output gear 36. The driving force transmitted to the output gear 36 is transmitted to a drive axle via a differential by a final reduction gear train, thereby driving wheels.

Further, the first motor generator 22 is driven via the first planetary gear mechanism 33 and the second planetary gear mechanism 34 by the driving force of the engine 2 and serves as a generator. The second motor generator 30 serves as an electric motor by the power generated by the first motor generator 22. The driving force generated by the second motor generator 30 is transmitted to the output gear 36 by the third planetary gear mechanism 35 and assists the driving force of the engine 2.

Figure 4:
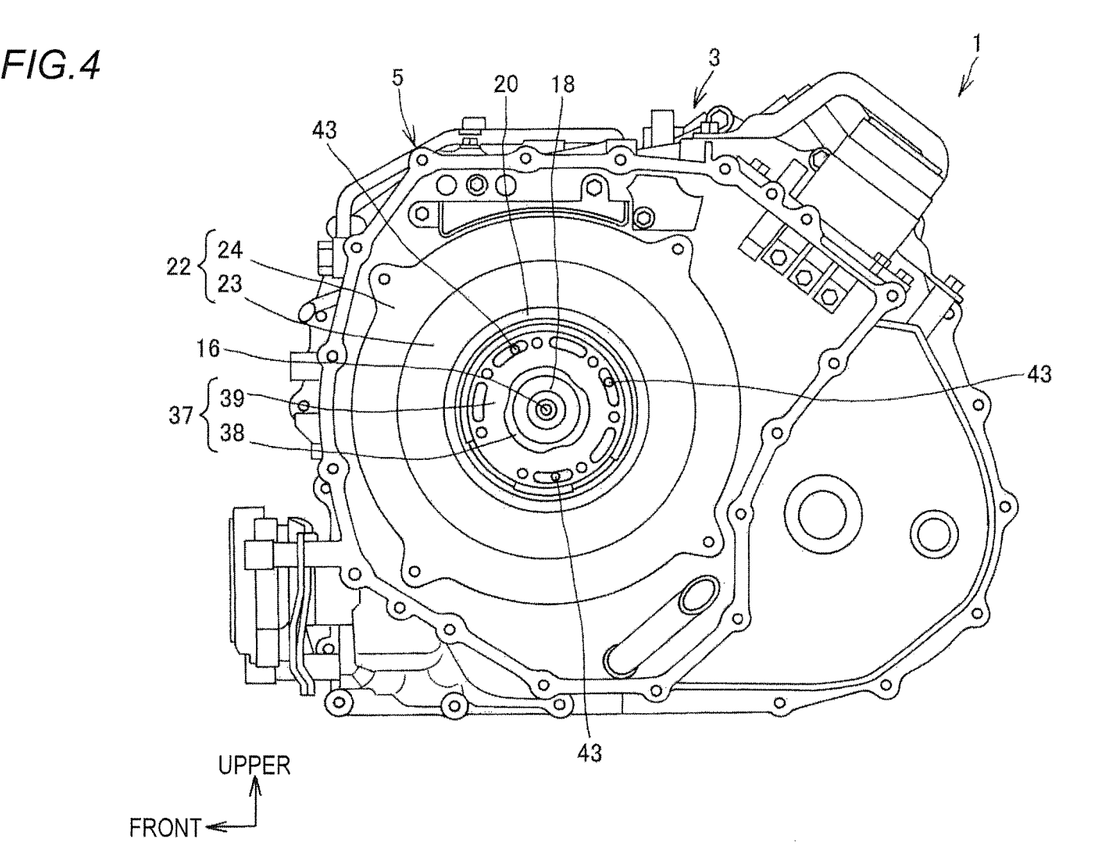
FIG. 4 is a sectional view of the vehicle driving device, taken along a line Y-Y in FIG. 3 according to an embodiment of the present invention.
Figure 5:
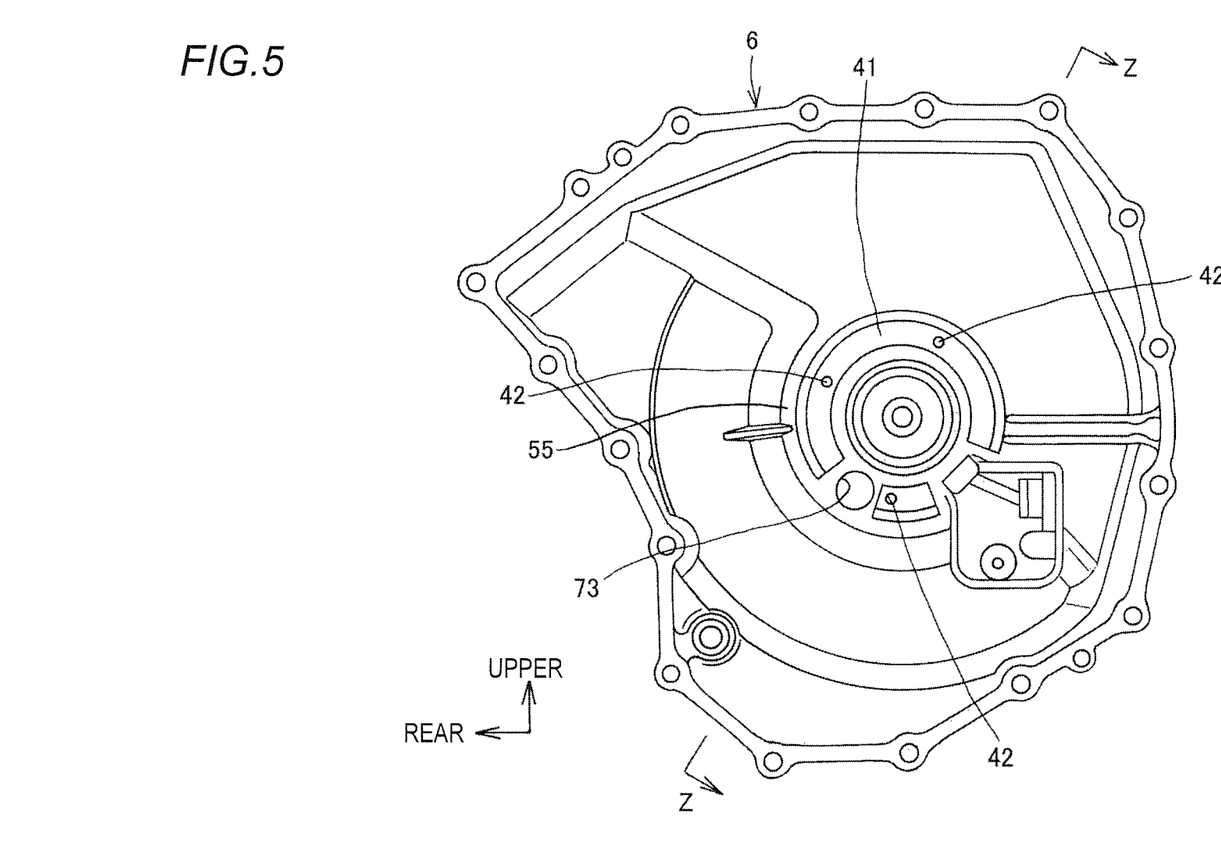
FIG. 5 is an interior view of an end wall, as seen from the inside of a drive case according to an embodiment of the present invention.
Figure 6:
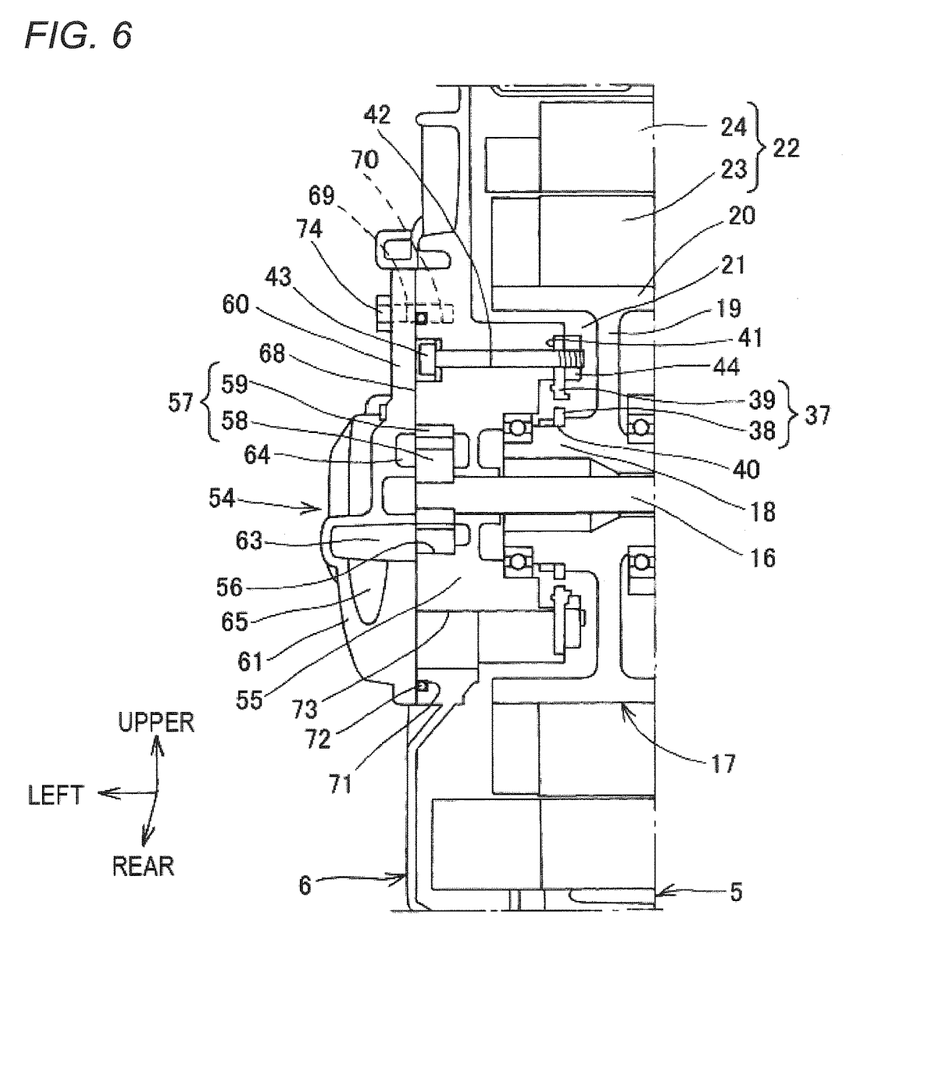
FIG. 6 is a sectional view of the vehicle driving device, taken along a line Z-Z in FIG. 5 according to an embodiment of the present invention.

The vehicle driving device 1 includes a first rotation detecting sensor 37 for detecting the rotation position of the first motor rotor 23 relative to the first motor stator 24 of the first motor generator 22. As shown in FIGS. 4 to 6, the first rotation detecting sensor 37 includes a first sensor rotor 38 and a first sensor stator 39. The first sensor rotor 38 rotates integrally with the first motor rotor 23. In the first rotation shaft 17 to support the first motor rotor 23, a first mounting portion 40 is formed on an outer peripheral surface of the first body portion 18, which faces the first space 21 surrounded by the first body portion 18, the first connecting portion 19 and the first rotor support portion 20. The first sensor rotor 38 is mounted to the first mounting portion 40 of the first body portion 18 so as to face outward in the radial direction.

The first sensor stator 39 is mounted to an inner surface of the end wall 6. A pump housing 55 (to be described later) is formed in an inner surface of the end wall 6, which faces the first connecting portion 19 of the first rotation shaft 17. The pump housing 55 is bulged into the first space 21. A first recess 41 is formed in an end surface of the pump housing 55 on the first motor rotor 23 side. The first recess 41 has a concave shape and accommodates the first sensor stator 39. A first through hole 42 is formed at the pump housing 55 formed in the end wall 6. The first through hole 42 is opened to the first recess 41 from the outer surface. An outer periphery of a leading end portion of the first sensor rotor 38 is surrounded and accommodated by the first recess 41 formed in the pump housing 55 in order to detect the rotation of the first sensor rotor 38 rotating integrally with the first motor rotor 23, and a first stator fastener 43 such as a mounting bolt inserted through the first through hole 42 is fastened to a first mounting tool 44 such as a mounting nut in contact with the first sensor rotor 39, so that the first sensor stator 39 is mounted to the end wall 6.

Thereby, in the first rotation detecting sensor 37, the first sensor rotor 38 and the first sensor stator 39 are disposed within the first space 21 surrounded by the first recess 41 of the pump housing 55, and the first connecting portion 19 and the first rotor support portion 20 of the first rotation shaft 17.

The vehicle driving device 1 includes a second rotation detecting sensor 45 for detecting the rotation position of the second motor rotor 31 relative to the second motor stator 32 of the second motor generator 30. The second rotation detecting sensor 45 includes a second sensor rotor 46 and a second sensor stator 47. The second sensor rotor 46 rotates integrally with the second motor rotor 31. In the second rotation shaft 25 to support the second sensor rotor 46, a second mounting portion 48 is formed on an outer peripheral surface of the second body portion 26, which faces the second space 29 surrounded by the second body portion 26, the second connecting portion 27 and the second rotor support portion 28. The second sensor rotor 46 is mounted to the second mounting portion 48 of the second body portion 26 so as to face outward in the radial direction.

The second sensor stator 47 is mounted to an inner surface of the auxiliary wall portion 9 on the second motor rotor 31 side. A bulging portion 49 is formed in an inner surface of the auxiliary wall portion 9, which faces the second connecting portion 27 of the second rotation shaft 25. The bulging portion 49 is bulged into the second space 29. A second recess 50 is formed in an end surface of the bulging portion 49 on the second motor rotor 31 side. The second recess 50 has a concave shape and accommodates the second sensor stator 47. A second through hole 51 is formed at the bulging portion 49 formed in the auxiliary wall portion 9. The second through hole 51 is opened to the second recess 50 from the end surface on the third planetary gear mechanism 35 side. An outer periphery of a leading end portion of the second sensor rotor 46 is surrounded and accommodated by the second recess 50 formed in the bulging portion 49 in order to detect the rotation of the second sensor rotor 46 rotating integrally with the second motor rotor 31, and a second stator fastener 52 such as a mounting bolt inserted through the second through hole 51 is fastened to a second mounting tool 53 such as a mounting nut in contact with the second sensor stator 47, so that the second sensor stator 47 is mounted to the auxiliary wall portion 9.

Thereby, in the second rotation detecting sensor 45, the second sensor rotor 46 and the second sensor stator 47 are disposed within the second space 29 surrounded by the second recess 50 of the bulging portion 49, and the second connecting portion 27 and the second rotor support portion 28 of the second rotation shaft 25.

Figure 7:
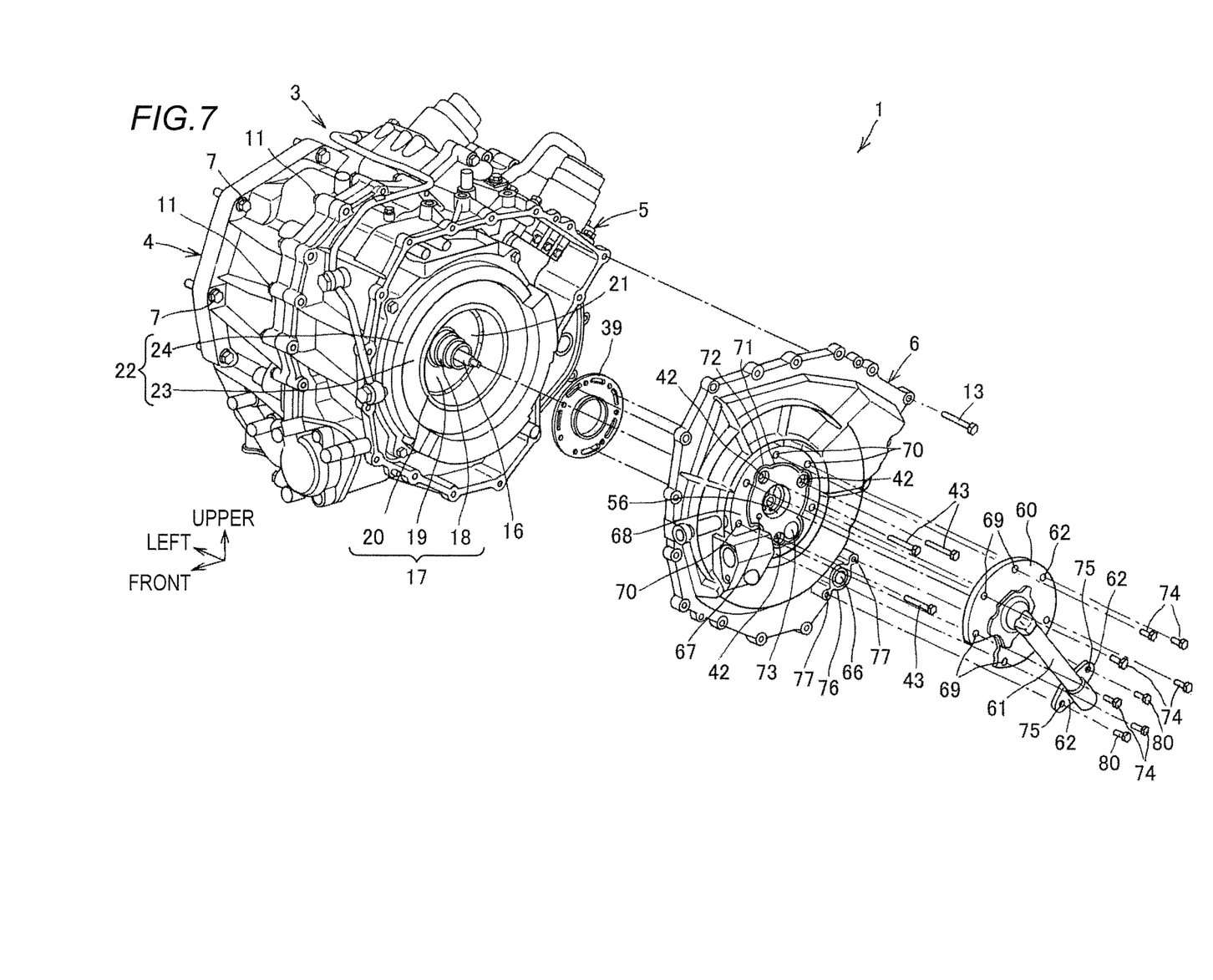
FIG. 7 is a deployment view showing an assembled state of the vehicle driving device according to an embodiment of the present invention.

The vehicle driving device 1 includes an oil pump 54 at the end wall 6. As shown in FIGS. 6 and 7, the oil pump 54 forms the pump housing 55 integrally with the end wall 6. An inner side of the end wall 6 is bulged into the first space 21 surrounded by the first body portion 18, the first connecting portion 19 and the first rotor support portion 20, so that the pump housing 55 is formed. As a result, in the first motor generator 22, the first motor stator 24 is disposed on an outer peripheral side of the pump housing 55, and the first rotor support portion 20 of the first rotation shaft 17 to support the first motor rotor 23 is disposed so as to overlap with the pump housing 55 in the radial direction of the first rotation shaft 17. The first recess 41 having a concave shape is formed at an end surface of the pump housing 55 on the first motor rotor 23 side.

A pump chamber 56 is concavely formed on a central portion of the pump housing 55 and on an outer surface of the end wall 6. A pump rotor 57 is disposed within the pump chamber 56 and driven by the pump connecting shaft member 16. The pump rotor 57 is composed of an inner rotor 58 and an outer rotor 59. The inner rotor 58 is rotated by the other end in an axial direction of the pump connecting shaft member 16, which penetrates the pump housing 55. The outer rotor 59 rotates eccentrically in engagement with the outer side of the inner rotor 58.

The oil pump 54 includes an oil pump cover 60 for making the pump chamber 56, in which the pump rotor 57 is disposed, into a closed space. The oil pump cover 60 has a cylindrical passage forming portion 61 which is formed in a substantially disc shape and extended downward and outward in the radial direction from the central portion. The passage forming portion 61 has a passage mounting portion 62 at a lower extension end.

The oil pump cover 60 includes a suction hole 63 communicating with the suction side of the pump chamber 56 and a discharge hole 64 communicating with the discharge side of the pump chamber 56. The suction hole 63 communicates with a suction passage 65 provided in the passage forming portion 61. The suction passage 65 is opened to a lower end of the passage forming portion 61 and communicates with an oil return passage 66 opened to a lower portion of an outer surface of the end wall 6. The oil return passage 66 supplies, to the suction passage 65, the oil after lubricating the first planetary gear mechanism 33 or the like in the drive case 3, and returns the oil to the oil pump 54. The discharge hole 64 communicates with an oil supply passage 67 which is opened to the vicinity of the pump chamber 56 on the outer surface of the end wall 6.

The oil discharged by the oil pump 54 is supplied to the first motor generator 22 and the second motor generator by the oil supply passage 67, and thus, prevents the first motor generator 22 and the second motor generator from being excessively heated. Further, the oil discharged by the oil pump 54 is supplied to the first planetary gear mechanism 33 or the like in the drive case 3 by the oil supply passage 67, and thus, lubricates each part.

The oil pump cover 60 is joined to a cover joining surface 68 formed on the outer surface of the end wall 6. The cover joining surface 68 has the openings of the oil supply passage 67 and the first through hole 42 on the outer surface of the end wall 6. The cover joining surface 68 is formed in an annular shape to surround the outer periphery of the pump chamber 56. The oil pump cover 60 has a plurality of cover through holes 69. The cover through holes 69 are arranged on an outer peripheral side of the openings of the oil supply passage 67 and the first through hole 42. The end wall 6 is provided at the cover joining surface 68 with a plurality of cover screw holes 70 which matches the cover through holes 69 of the oil pump cover 60. Each of the cover screw holes 70 has a shape opened only to the outside of the end wall 6. The cover screw holes 70 are arranged on the outer peripheral side of the openings of the oil supply passage 67 and the first through hole 42.

Further, the end wall 6 is provided at the cover joining surface 68 with an annular seal groove 71 surrounding the pump chamber 56. The seal groove 71 is disposed in an inner peripheral side of the cover screw hole 70 and in an outer peripheral side of the openings of the oil supply passage 67 and the first through hole 42. An annular seal member 72 is assembled to the seal groove 71. In the cover joining surface 68 on the inner peripheral side of the seal member 72, a position adjusting hole 73 for adjusting the position of the first sensor stator 39 is formed. The position adjusting hole 73 is formed so as to penetrate from the outer surface to the inner surface of the end wall 6.

The oil pump cover 60 is disposed on the cover joining surface 68, and a cover fastener 74 such as a mounting bolt inserted through the cover through hole 69 is fastened to the cover screw hole 70, so that the oil pump cover 60 is joined to the cover joining surface 68. The pump chamber 56 and the openings of the oil supply passage 67 and the first through hole 42 are sealed by the seal member 72 arranged between the oil pump cover 60 and the cover joining surface 68.

The passage forming portion 61 of the oil pump cover 60 has a passage mounting portion 62 at a lower end to which the suction passage 65 is opened. As shown in FIG. 7, the passage mounting portion 62 has a mounting portion through hole 75. The passage mounting portion 62 is arranged at both sides across the opening of the suction hole 65 and joined to a passage portion joining surface 76 formed in a lower portion of the outer surface of the end wall 6. The passage portion joining surface 76 is faulted in a shape where a small-diameter annular shape is respectively arranged at both sides of an annular shape surrounding the opening of the oil return passage 66 provided in a lower portion of the outer surface of the end wall 6. The end wall 6 has passage portion screw holes 77 matching the mounting portion through holes 75 of the passage mounting portion 62 at the passage portion joining surface 76. Each of the passage portion screw holes 77 has a shape opened only to the outside of the end wall 6 and is arranged at both sides across the opening of the oil return passage 66. The passage portion joining surface 76 of the end wall 6 has an annular seal groove 78 surrounding the opening of the oil return passage 66, as shown in FIG. 2. The seal groove 78 is disposed on an inner peripheral side of the passage portion screw hole 77 and on an outer peripheral side of the opening of the oil return passage 66. An annular seal member 79 is mounted to the seal groove 78.

The passage mounting portion 62 is disposed on the passage portion joining surface 76, and a passage portion fastener 80 such as a mounting bolt inserted through the mounting portion through hole 75 is fastened to the passage portion screw hole 77, so that the passage forming portion 61 is joined to the passage portion joining surface 76. In the passage forming portion 61, the opening of the oil return passage 66 is sealed by a seal member 79 arranged between the passage mounting portion 62 and the passage portion joining surface 76.

In this vehicle driving device 1, a cover joining surface 68 is formed on an outer surface of the end wall 6. The oil pump cover 60 is joined to the cover joining surface 68. The cover joining surface 68 has the openings of the oil supply passage 67 and the first through hole 42 and is formed in an annular shape surrounding the outer periphery of the pump chamber 56. In the cover joining surface 68 of the end wall 6, a plurality of cover screw holes 70 matching the cover through holes 69 of the oil pump cover 60 is provided. Each of the cover screw holes 70 has a shape opened only to the outside of the end wall 6 and is arranged outside of the seal member 72. Further, in the vehicle driving device 1, the first through hole 42, through which the first stator fastener 43 of the first sensor stator 39 is inserted, is disposed on the cover joining surface 68 inside of the seal member 72.

As such, the vehicle driving device 1 has a structure that the first through hole 42, through which the first stator fastener 43 for fixing the first sensor stator 39 to the end wall 6 is inserted, is disposed on the inside of the seal member 72 of the cover joining surface 68. Therefore, the seal between the first stator fastener 43 and the first through hole 42 and the seal for the oil pump 54 can be achieved by one seal member 72, without providing a plurality of seal members in the oil pump as in a conventional structure. As a result, one seal member 72 can prevent the leakage of the oil from the oil pump 54 and the portion between the first stator fastener 43 and the first through hole 42.

In this way, a worker can reduce a work of mounting the oil pump 54, thereby improving the workability.

Furthermore, in this vehicle driving device 1, the first through hole 42, through which the first stator fastener 43 is inserted, is disposed on the inside of the seal member 72 of the oil pump 54. Accordingly, there is no need to excessively increase a diameter dimension of the first rotation detecting sensor 37. As a result, it is possible to reduce the dimension in the radial direction of the first rotation detecting sensor 37.

Thereby, in the vehicle driving device 1, the first rotation detecting sensor 37 can be easily accommodated in the first space 21 surrounded by the first rotation shaft 17 and the first motor generator 22 disposed on an outer periphery of the first rotation shaft 17, and the first rotation detecting sensor 37 and the first motor generator 22 can be arranged in an overlapped manner in the axial direction of the first rotation shaft 17. As a result, it is possible to reduce the size of the device.

In the vehicle driving device 1, the first recess 41 having a concave shape is formed in an end surface on the first motor rotor 23 side of the pump housing 55 for forming the pump chamber 56, and the first through hole 42 is formed to be opened to the first recess 41 from the outer surface of the end wall 6. In the vehicle driving device 1, the first sensor stator 39 of the first rotation detecting sensor 37 is accommodated and mounted to the first recess 41 by the first stator fastener 43 inserted through the first through hole 42.

As such, the vehicle driving device 1 has a structure that the first sensor stator 39 of the first rotation detecting sensor 37 is accommodated in the first recess 41 formed in the pump housing 55 of the oil pump 54. Therefore, the pump housing 55 and the first sensor stator 39 can be arranged in an overlapped manner in a radial direction of the first rotation shaft 17. Furthermore, in the vehicle driving device 1, the first recess 41, in which the first sensor stator 39 is accommodated, is formed in the pump housing 55, so that it is possible to reduce the size of the first rotation detecting sensor 37.

With these configurations, it is possible to reduce the size of the vehicle driving device 1 in the axial direction of the first rotation shaft 17 and the radial direction of the first rotation shaft 17.

Furthermore, in the vehicle driving device 1, the first through hole 42, through which the first stator fastener 43 is inserted, is opened to the first recess 41 of the pump housing 55. Accordingly, there is no need to form a mounting portion dedicated to the insertion of the first stator fastener 43, separately from the pump housing 55. Further, the first sensor stator 39 can be supported by the pump housing 55 having relatively high rigidity.

Therefore, in the vehicle driving device 1, the first sensor stator 39 is supported by the pump housing 55 having relatively large volume amount, and thus, the contact area of the first sensor stator 39 held in the end wall 6 of the drive case 3 can be increased. Therefore, the first sensor stator 39 can be stably disposed in the end wall 6 of the drive case 3.

Thereby, in the vehicle driving device 1, the pump housing 55 can suppress the first sensor stator 39 from being displaced even when the vibration of the pump rotor 57 provided in the oil pump 54 is transmitted to the first stator fastener 43. Further, the rotation position detection of the first sensor rotor 38 by the first sensor stator 39 can be stably carried out, so that it is possible to improve the reliability of the first rotation detecting sensor 37.

Furthermore, in the vehicle driving device 1, the first sensor stator 39 is accommodated in the first recess 41 of the pump housing 55. Therefore, an outer peripheral edge of the first sensor stator 39 can be disposed on the pump rotor 57 side than an outer peripheral surface of the pump housing 55 in the radial direction of the first rotation shaft 17. As a result, it is possible to increase a distance between the first motor stator 24 and the first rotation detecting sensor 37.

Thereby, in the vehicle driving device 1, magnetism occurring between the first motor stator 24 and the first motor rotor 23 is unlikely to reach the first rotation detecting sensor 37. Therefore, it is possible to prevent the reliability of the first rotation detecting sensor 37 from being damaged due to the magnetism by the first motor generator 22.

In addition, the vehicle driving device 1 has a structure that the first through hole 42, through which the first stator fastener 43 is inserted, is opened to the first recess 41 formed in the pump housing 55. Therefore, the oil leakage can be prevented by one seal member 72 for carrying out the seal between the first stator fastener 43 and the first through hole 42 and the seal for the pump rotor 57. As a result, it is not necessary for a worker to provide a plurality of seal members dedicated to the stator fastener as in the conventional structure, in order to prevent the oil leakage to the outside of the end wall 6 of the drive case 3 from the portion between the first stator fastener 43 and the first through hole 42.

Thereby, in the vehicle driving device 1, the load on the operator's assembling work can be reduced, thereby improving the workability.

In the vehicle driving device 1, the first motor stator 24 of the first motor generator 22 is disposed on an outer peripheral side of the pump housing 55, and the first rotor support portion 20 of the first rotation shaft 17 to support the first motor rotor 23 is disposed so as to overlap with the pump housing 55 in the radial direction of the first rotation shaft 17. In the vehicle driving device 1, the first rotation detecting sensor 37 is disposed within the first space 21 surrounded by the first recess 41 of the pump housing 55 and the first connecting portion 19 and the first rotor support portion 20 of the first rotation shaft 17.

Thereby, in the vehicle driving device 1, the first rotor support portion 20 can prevent the magnetism from being transmitted to the first rotation detecting sensor 37 even when the magnetism occurring between the first motor stator 24 and the first motor rotor 23 passes through the first motor rotor 23 and flows to the first rotation shaft 17 side.

Furthermore, in the vehicle driving device 1, the pump housing 55, the first connecting portion 19 and the first rotor support portion 20 prevent the magnetism from directly flowing to the first space 21 in which the first rotation detecting sensor 37 is disposed even when the magnetism occurring between the first motor stator 24 and the first motor rotor 23 flows into a space within the drive case 3. Therefore, the first rotation detecting sensor 37 can be prevented from being affected by the magnetism from the first motor generator 22. As a result, the rotation position detection precision of the first rotation detecting sensor 37 is increased, and thus, it is possible to improve the reliability of the first rotation detecting sensor 37.

Moreover, as described above, the vehicle driving device 1 has a structure that the first motor stator 24 is disposed on an outer peripheral side of the pump housing 55, the first rotor support portion 20 is disposed so as to overlap with the pump housing 55 in the radial direction of the first rotation shaft 17, and the first rotation detecting sensor 37 is disposed within the first space 21. Therefore, the axial dimension of the pump connecting shaft member 16 and the radial dimension of the first rotation shaft 17 can be shortened, thereby reducing the size of the device.

In the vehicle driving device 1, the position adjusting hole 73 for adjusting the position of the first sensor stator 39 is formed on the inner peripheral side of the seal member 72 of the cover joining surface 68 of the end wall 6, to which the oil pump cover 60 is joined.

Thereby, the vehicle driving device 1 has a structure that the position adjusting hole 73 is formed on an inner peripheral side of the seal member 72 of the joining surface of the end wall 6. Therefore, the position adjusting hole 73 is sealed by the seal member 72, and thus, there is no need to provide a dedicated plug for plugging the position adjusting hole 73 of the first sensor stator 39. As a result, the seal effect can be achieved just by covering the position adjusting hole 73 with the oil pump cover 60.

Therefore, the vehicle driving device 1 can reduce the amount of an assembling work of a worker.

The present invention can prevent the oil leakage while achieving the improvement in the assembling workability and the reduction in size of a vehicle driving device having a drive case for accommodating a driving force transmitting mechanism. The present invention can be applied to a hybrid vehicle or the like which includes an engine and a motor.

What is claimed is:

1. A vehicle driving device comprising:
   a rotation shaft disposed on an outer periphery of a pump connecting shaft member configured to be driven by an engine;
   a motor disposed on an outer periphery of the rotation shaft;
   a drive case having an end wall extending along an end surface of the motor, a central portion of the end wall through which the pump connecting shaft member penetrates;
   a rotation detecting sensor having a sensor rotor configured to rotate integrally with a motor rotor of the motor and a sensor stator which is fixed to an inner surface of the end wall by a stator fastener penetrating through the end wall in order to detect a rotation of the sensor rotor; and
   an oil pump comprising:
      a pump rotor disposed within a pump chamber formed on an outer surface of the end wall and configured to be driven by the pump connecting shaft member;
      an oil pump cover joined to a joining surface formed on the outer surface of the end wall by fastening a cover fastener to a cover screw hole arranged in the joining surface, in order to make the pump chamber into a closed space; and
      a seal member formed in an annular shape to surround an outer periphery of the pump chamber and disposed between the joining surface and the oil pump cover,
   wherein the cover screw hole is formed into a shape opened only to the outside of the drive case and disposed on the joining surface outside of the seal member, and a through hole through which the stator fastener is inserted, is disposed on the joining surface inside of the seal member.

2. The vehicle driving device according to claim 1, wherein a recess having a concave shape is formed on a motor rotor side end surface of a pump housing for forming the pump chamber, the through hole is opened to the recess, and the rotation detecting sensor is accommodated in the recess by the stator fastener inserted through the through hole.

3. The vehicle driving device according to claim 2, wherein a motor stator of the motor is disposed on an outer peripheral side of the pump housing, a rotor support portion of the rotation shaft for supporting the motor rotor is disposed so as to overlap with the pump housing in a radial direction of the rotation shaft, and the rotation detecting sensor is disposed within a space surrounded by the recess of the pump housing, a connecting portion of the rotation shaft facing the pump housing and the rotor support portion.

4. The vehicle driving device according to claim 1, wherein a position adjusting hole for adjusting a position of the sensor stator is formed on the joining surface to which the oil pump cover is joined, at an inner peripheral side of the seal member.

\* \* \* \* \*